United States Patent [19]
Nishishita et al.

[11] Patent Number: 5,630,326
[45] Date of Patent: May 20, 1997

[54] EXPANSION VALVE MOUNTING MEMBER

[75] Inventors: Kunihiko Nishishita; Seiji Inoue, both of Konan, Japan

[73] Assignee: Zexel Corporation, Tokyo, Japan

[21] Appl. No.: 527,424

[22] Filed: Sep. 13, 1995

[30] Foreign Application Priority Data

Sep. 14, 1994 [JP] Japan .................... 6-246922

[51] Int. Cl.$^6$ .................................. F25B 41/04
[52] U.S. Cl. .................. 62/299; 165/153; 165/176; 285/137.1
[58] Field of Search ............... 62/216, 527, 528, 62/299; 285/137.1; 165/153, 176

[56] References Cited

U.S. PATENT DOCUMENTS

| | | | |
|---|---|---|---|
| 3,512,806 | 5/1970 | Romney et al. | 285/137.1 |
| 3,869,153 | 3/1975 | De Vincent et al. | 285/137.1 |
| 4,468,054 | 8/1984 | Orth | 285/137.1 |
| 5,146,766 | 9/1992 | Martins | 285/137.1 |
| 5,169,178 | 12/1992 | Hunzinger | 285/137.1 |
| 5,354,103 | 10/1994 | Torrence et al. | 285/137.1 |

FOREIGN PATENT DOCUMENTS

| | | |
|---|---|---|
| 481 871 | 4/1992 | European Pat. Off. . |
| 43 34 570 | 4/1995 | Germany . |
| 2 283 070 | 4/1995 | United Kingdom . |

*Primary Examiner*—William E. Tapolcai
*Attorney, Agent, or Firm*—Wenderoth, Lind & Ponack

[57] ABSTRACT

In order to achieve reduced production costs in an expansion valve mounting member used for mounting an expansion valve on a heat exchanger and an improvement in its suitability for mass production, the expansion valve mounting member has a pair of tubular members, each of which is formed as a pipe, with one end of the pair connecting with a pair of coolant intake/outlet portions provided parallel to each other in the heat exchanger and the other end connecting with the expansion valve. A collar is provided at a specific position on the external circumferential side surface of each tubular member. A plate member is provided with a pair of holes into which the pair of tubular members are inserted. When the tubular members are fitted into the holes of the plate member, the collars come in contact with the circumferential edges of the holes to establish positioning.

7 Claims, 6 Drawing Sheets

EXPANSION VALVE MOUNTING MEMBER

BACKGROUND OF THE INVENTION

1. Field of the Invention

The present invention relates to an improvement in the structure of an expansion valve mounting member used for connecting a block type expansion valve to a laminated heat exchanger in, for instance, an air conditioning system for vehicles.

2. Description of the Related Art

Structures in which a block type expansion valve is mounted in the vicinity of the intake/outlet portions of a laminated heat exchanger using an expansion valve mounting member in the known art include the one disclosed in Japanese Unexamined Patent Publication No. 64-28762.

To outline the structure in which an expansion valve is mounted to a laminated heat exchanger using an expansion valve mounting member in reference to this example, piping for coolant inflow and piping for coolant outflow are provided parallel to each other over a specific distance at the center in the direction of the lamination in the laminated heat exchanger. A plate-like coupling member is provided with an inflow piping connecting hole and an outflow piping connecting hole through the coupling member, which communicate with the piping for coolant inflow and the piping for coolant outflow respectively and on the circumferential edges of the inflow piping connecting hole and the outflow piping connecting hole, projected portions that fit into the piping for coolant inflow and the piping for coolant outflow are formed. On the side surface opposite from where the projected portions are provided in the plate-like coupling member, roughly cylindrical protrusions project out from the circumferential edges of the connecting holes. In addition, two through holes with an internal diameter which allows the cylindrical protrusions of the plate-like coupling member to be fitted therein, are formed in the block type expansion valve.

The following is an explanation of the mounting procedure for the block type expansion valve structured as described above. After fitting the piping for coolant inflow and the piping for coolant outflow to the projected portions of the plate-like coupling member, the protrusions of the plate-like coupling member are inserted inside the corresponding holes in the block type expansion valve and then the plate-like coupling member is secured to the block type expansion valve with screws.

However, the projected portions, the protrusions, the inflow piping connecting hole and the outflow piping connecting hole which constitute the plate-like coupling member in this prior art example, are manufactured by cutting them out from an aluminum material (the so-called full cutting method) and, as a result, the production costs for the plate-like coupling member are high. Also, another problem is that the method is not well suited to mass production.

SUMMARY OF THE INVENTION

The object of the present invention is to provide an expansion valve mounting member that achieves lowered production costs and that is better suited to mass production.

Accordingly, the present invention is an expansion valve mounting member comprising a pair of tubular members each of which is formed like a pipe with one end of the pair connecting with a pair of coolant intake/outlet portions provided parallel to each other in a heat exchanger and the other end connecting with an expansion valve. A collar is at a specific position on the external circumferential side surface of each tubular member. A plate member is provided with a pair of holes into which the pair of tubular members are inserted. When the tubular members are fitted into the holes of the plate member, the collars come in contact with the circumferential edges of the holes to establish positioning.

The present invention also emcompasses an expansion valve mounting member comprising a pair of tubular members, each of which is formed like a pipe with one end of the pair connecting with a pair of coolant intake/outlet portions provided parallel to each other in a heat exchanger and the other end connecting with an expansion valve. A staged portion is provided on each tubular member, where its diameter increases from a first diameter to a second diameter at a specific position on the external circumferential side surface thereof. A plate member is provided with a pair of holes in which the pair of tubular members are inserted. When the tubular members are fitted into the holes of the plate member, the staged portions come in contact with the circumferential edges of the holes to establish positioning.

Consequently, with the expansion valve mounting member according to the present invention, the tubular members and the plate member can be manufactured separately through the most suitable processes. At the same time, the tubular members can be mounted by inserting them into the holes in the plate member. This means that the production costs can be kept low compared to a structure that requires the full cutting method and that mass production is facilitated.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

DETAILED DESCRIPTION OF THE PREFERRED EMBODIMENTS

Figure 1:
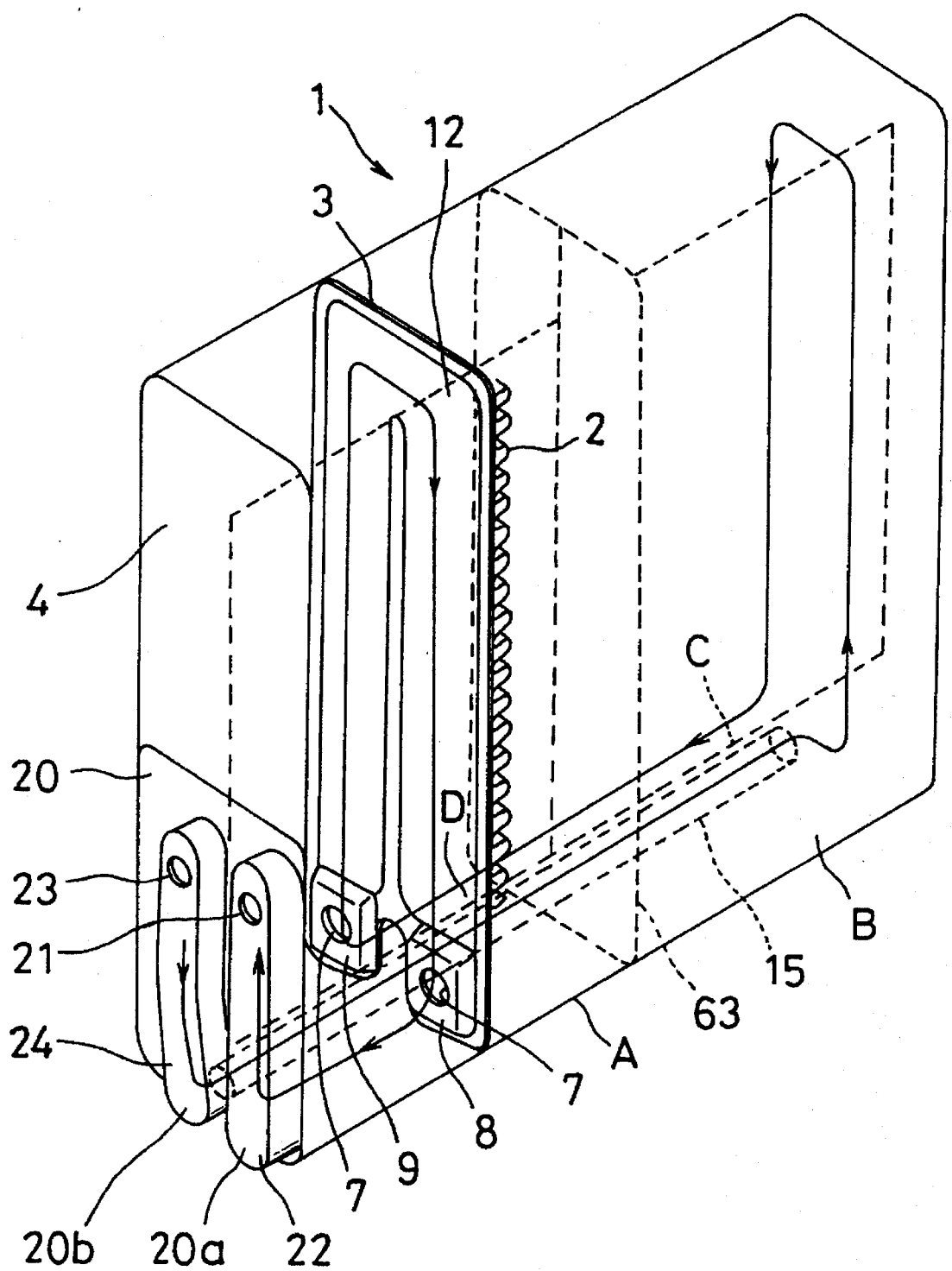
FIG. 1 illustrates the overall structure of a laminated heat exchanger that employs an expansion valve mounting member in an embodiment according to the present invention.

The following is an explanation of embodiments according to the present invention in reference to the drawings.

A laminated heat exchanger 1 is constituted by laminating, for instance, tube elements 3, each of which is provided with a pair of tanks 8 and 9, each of which, in turn, is provided with a communicating hole 7 at one end and a coolant passage 12 that communicates between the tank 8 and the tank 9, alternately with fins 2. In order to achieve the so-called 4-pass coolant flow, the laminated heat exchanger 1 is provided with a tube element 63 at the center in the direction of the lamination, in which a blind tank (not shown) is formed on the tank 8 side. With this, the tube elements 3 and 63 are laminated so that there is communication among the tanks 9, thereby forming tank groups C and D and among the tanks 8, forming tank groups A and B. Note that the tube element 63 keeps tank groups C and D communicating with each other while it cuts off tank group A from tank group B.

In addition, in order to provide a pair of coolant intake /outlet portions at one side of the laminated heat exchanger 1, a communicating pipe 15 is provided, which communicates between the intake/outlet side and the tube elements located on the opposite side from the intake/outlet side. In addition, a plate for intake/outlet passage formation 20, for constituting an outlet passage 22 and an intake passage 24, is provided at an end plate 4 on one side in such a manner that the intake passage 24 communicates with the communicating pipe 15 and the outlet passage 22 communicates with the tank group A. An expansion valve mounting member 30 to be described below, is mounted through a hole 21 formed in the outlet passage 22 and a hole 23 formed in the intake passage 24.

Thus, in this embodiment, coolant that has flowed in through the hole 23 of the intake passage 24, travels through the communicating pipe 15 to flow into the tank group B, then travels through the coolant passage 12 to flow into the tank group C and from the tank group C is delivered to the tank group D, which is provided continuously to the tank group C. Then, the coolant flows through the coolant passage 12 into the tank group A and travels through the outlet passage 20 to flow out through the hole 21, thus completing its 4-pass flow relative to the air that passes through the heat exchanger.

Note that an explanation of the basic structure of the tube elements and corrugated fins constituting the laminated heat exchanger is omitted since they are practically identical to those in the prior art. The following is an explanation of the structures of the end plate 4, the plate for intake/outlet passage formation 20 and the expansion valve mounting member 30, which constitute the main part of the present invention.

Figure 2:
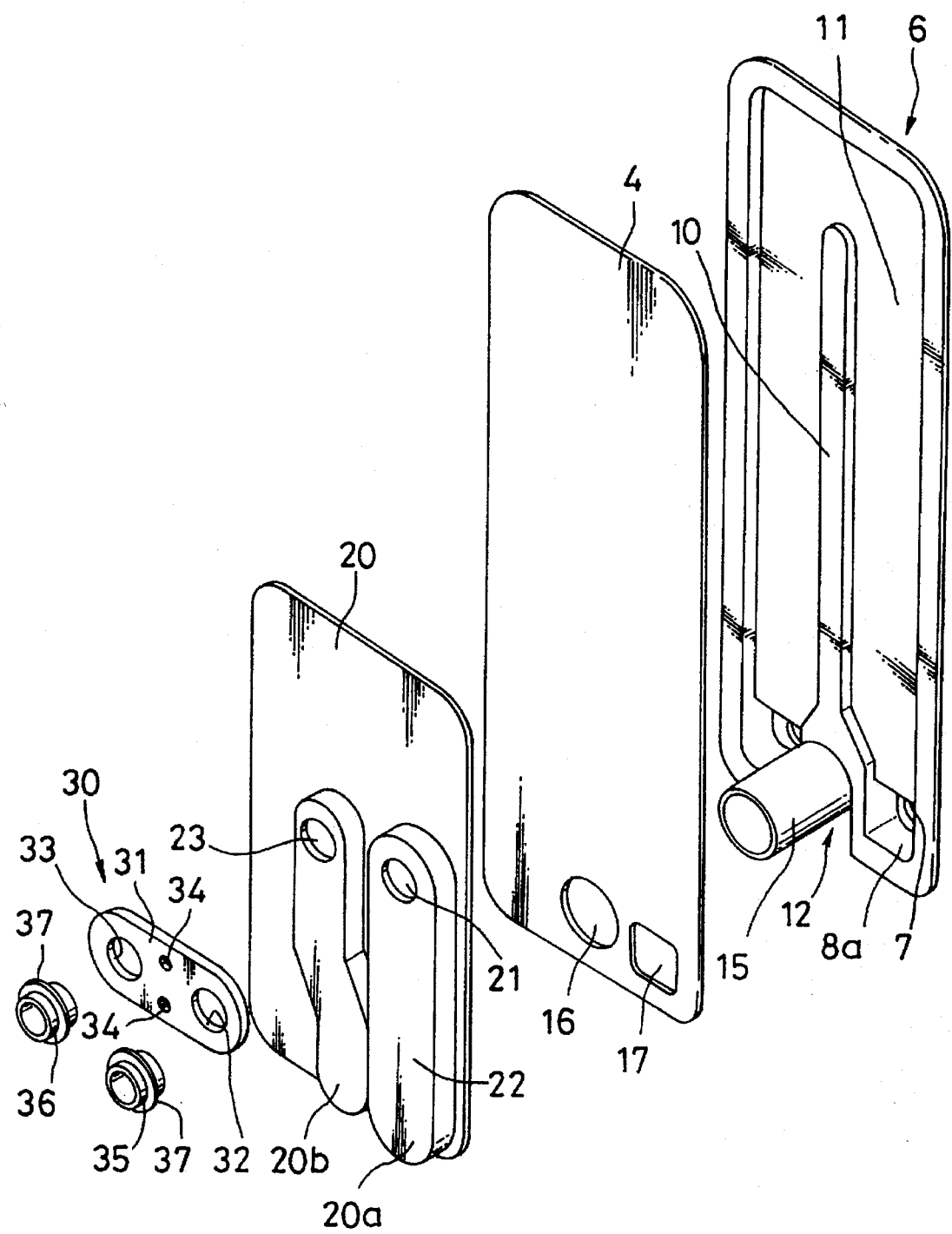
FIG. 2 illustrates a temporary assembly process for formed plates, end plates and a plate for intake/outlet passage formation used in the above laminated heat exchanger.

A formed plate 6 is formed, as shown in FIG. 2, for example, by dressing the surface of a material constituted mainly of aluminum, with a brazing material. A pair of distended portions for tank formation 8a and 9a are formed toward one end in the direction of the length and a communicating hole 7 is formed in each of the distended portions for tank formation 8a and 9a. A projection 10 extends from approximately the center between the distended portions for tank formation 8a and 9a toward the other end and, extending from the peripheral edge of the projection 10, a distended portion for coolant passage formation 11 is formed, which is roughly U-shaped and communicates between the distended portions for tank formation 8a and 9a. In addition, an indented portion which is indented toward the inside for accommodating the communicating pipe 15, is formed between the distended portions for tank formation 8a and 9a. The tube elements 3, which constitute a major portion of the laminated heat exchanger, are each constituted by bonding together two formed plates 6 face-to-face.

Each of the end plates is formed by dressing the surface of a plate, which is a flat plate of material whose main constituent is aluminum, with a brazing material. The end plates block off the formed plates located at the two ends of the laminated heat exchanger. To be more specific, as shown in FIG. 2 the end plate 4, toward the intake/outlet portions, is provided with a hole 16, which opens at a position that corresponds to the indented portion 13 of the formed plate 6 and into which the communicating pipe 15 is fitted, and a hole 17, which opens at a position that corresponds to the distended portion for tank formation 8a of the formed plate 6.

In addition, the plate for intake/outlet passage formation 20 is secured on to the end plate 4. Note that this plate for intake/outlet passage formation 20, too, is formed by dressing a material whose main constituent is aluminum, with a brazing material.

Figure 3:
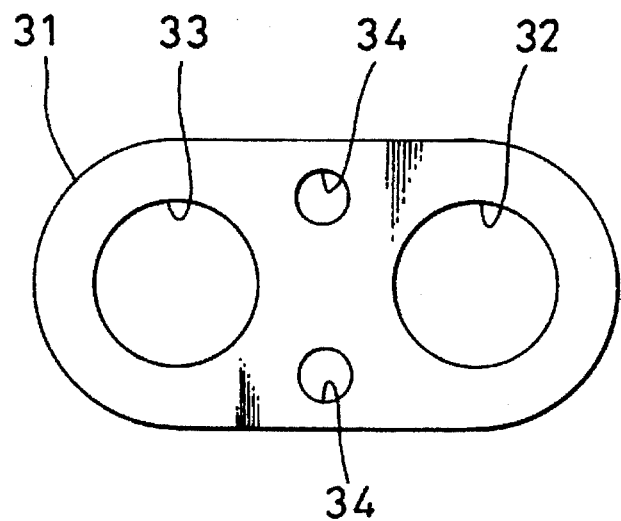
FIG. 3 illustrates a plate member that constitutes an expansion valve mounting member viewed from the front.

As shown in FIGS. 2 and 3, the plate for intake/outlet passage formation 20 is provided with a distended portion 20a which, in turn, is provided with the hole 21, into which a tubular member 35, to be detailed below, is fitted, and a distended portion 20b which, in turn is provided with the hole 23, into which a tubular member 36, to be detailed below, is fitted. With the distended portions 20a and 20b blocked off by the end plate 4, the outlet passage 22 that communicates between the hole 17 of the end plate 4 and the hole 21 of the distended portion 20a, and the intake passage 24 that communicates between the hole 16 of the end plate 4 and the hole 23 of the distended portion 20b, are formed.

The expansion valve mounting member 30 connects the distended portions 20a and 20b described earlier to an expansion valve (not shown) and, as shown in FIGS. 2–6, it is constituted by 3 members, i.e., a plate member 31 and the two tubular members 35 and 36.

The plate member 31 is manufactured by, for instance, machining an extruded material whose main constituent is aluminum to a specific thickness and, as shown in FIG. 3, it is provided with a pair of holes 32 and 33 the internal diameters of each being approximately equal to the external diameter of tubular members 35 and 36 to be detailed below. The distance between the holes 32 and 33 is equal to the distance between the holes 21 and 23 of the plate for intake/outlet passage formation 20. In addition, the plate member 31 is provided with a pair of threaded holes 34 that are provided between the holes 32 and 33 so that screws can be fitted in the screw holes 34 to hold the expansion valve to the core of the heat exchanger.

The tubular members 35 and 36 have the form of pipes and are constituted mainly of aluminum. Each of them is provided with a collar 37, formed approximately at the center in the direction of the axis, through press machining. The collars 37 come in contact with the edges of the holes 32 and 33 when the tubular members 35 and 36 are fitted into the holes 32 and 33 of the plate member 31.

Figure 4:
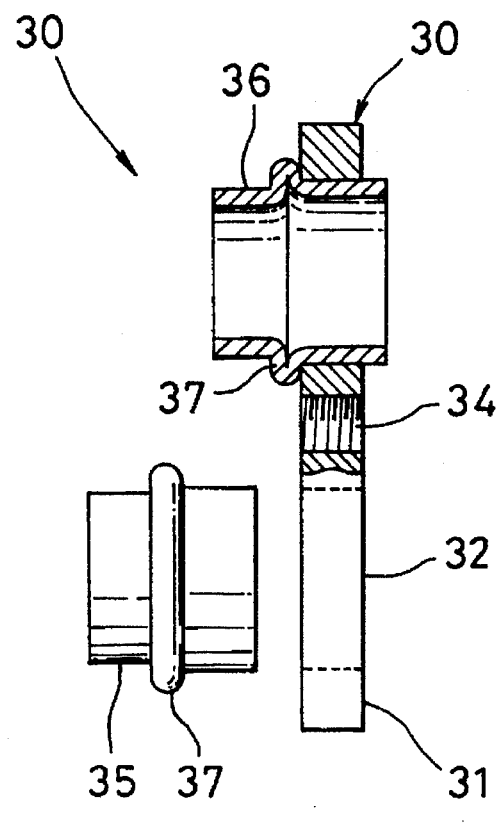
FIG. 4 illustrates the process in which the tubular members are inserted into the plate member.

With this, as shown in FIG. 4, by inserting the tubular members 35 and 36 into the holes 32 and 33 of the plate member 31 from the side where the expansion valve is to be mounted until the collars 37 come in contact with the holes 32 and 33, portions of the tubular members 35 and 36 come to protrude out from the holes 32 and 33 and temporary assembly of the expansion valve mounting member 30 is completed.

Figure 5:
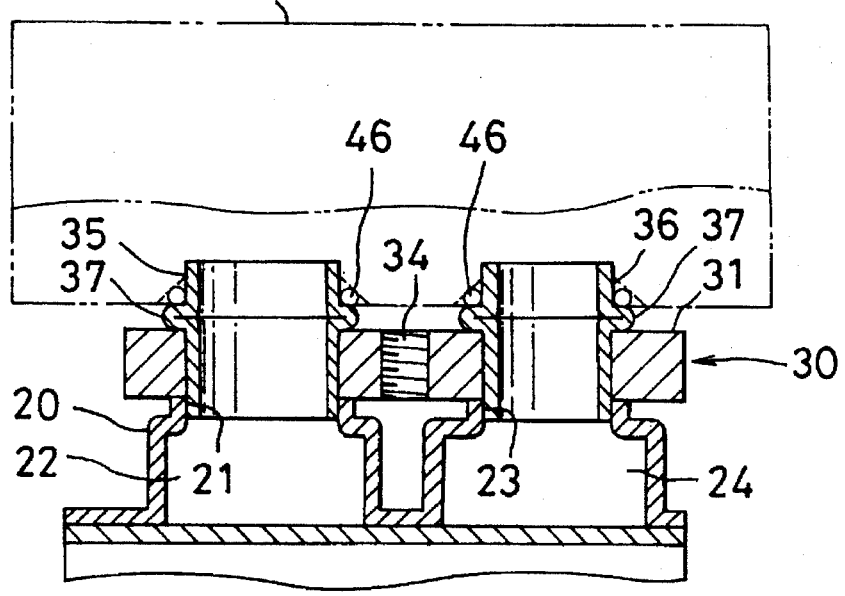
FIG. 5 illustrates the process in which the expansion valve mounting member is temporarily mounted to the plate for intake/outlet passage formation.

Next, as shown in FIG. 5, the expansion valve mounting member 30 thus temporarily assembled is temporarily mounted on the laminated heat exchanger 1 by inserting the protruding portion of the tubular member 35, which protrudes out of the expansion valve mounting member 30, into the hole 21 provided in the distended portion 20a of the plate for intake/outlet passage formation 20 and by inserting the protruding portion of the tubular member 36 into the hole 23 provided in the distended portion 20b. Then the assembly is completed by brazing the expansion valve mounting member 30 and the heat exchanger together in a furnace.

Note that, while in the above embodiment above, the plate member 1 and the tubular members 35 and 36 of the expansion valve mounting member 30 are fixed through brazing in a furnace, the plate member 31 and the tubular members 35 and 36 of the expansion valve mounting member 30 may be fixed together by press fitting.

In addition, as shown in FIG. 5, when mounting an expansion valve 45 at the tubular members 35 and 36, the collars 37 retain o-rings 46 and thus seal the portions where the expansion valve 45 is bonded.

As has been explained, since separate and different manufacturing processes can be selected for the plate member 31 and the tubular members 35 and 36 that constitute the expansion valve mounting member 30, processes which are more economical and more suitable for mass production can be separately and individually selected.

Figure 6:
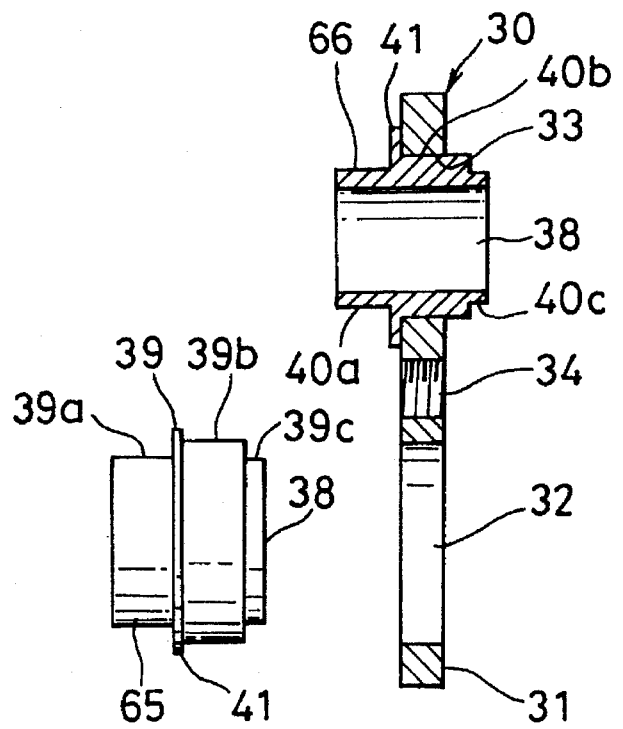
FIG. 6 illustrates tubular members obtained by machining rod-like members which are different from the tubular members used in the expansion valve mounting member in the above embodiment.
Figure 7:
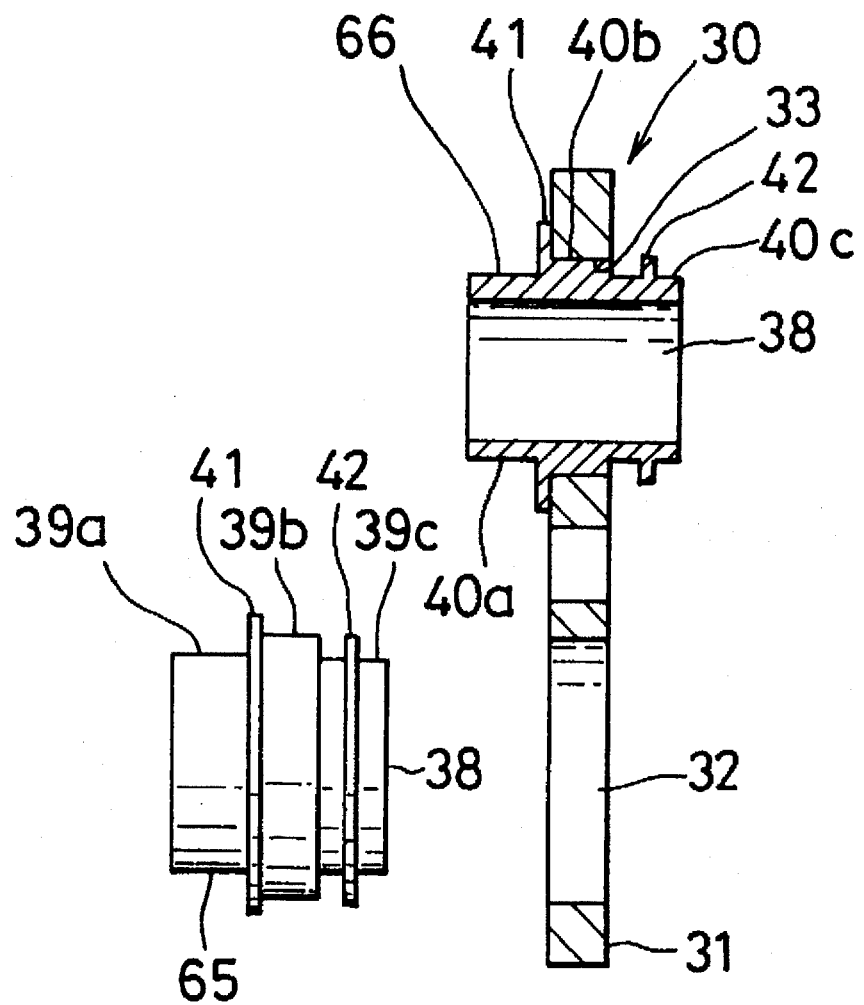
FIG. 7 illustrates a variation of the tubular members presented above.
Figure 8:
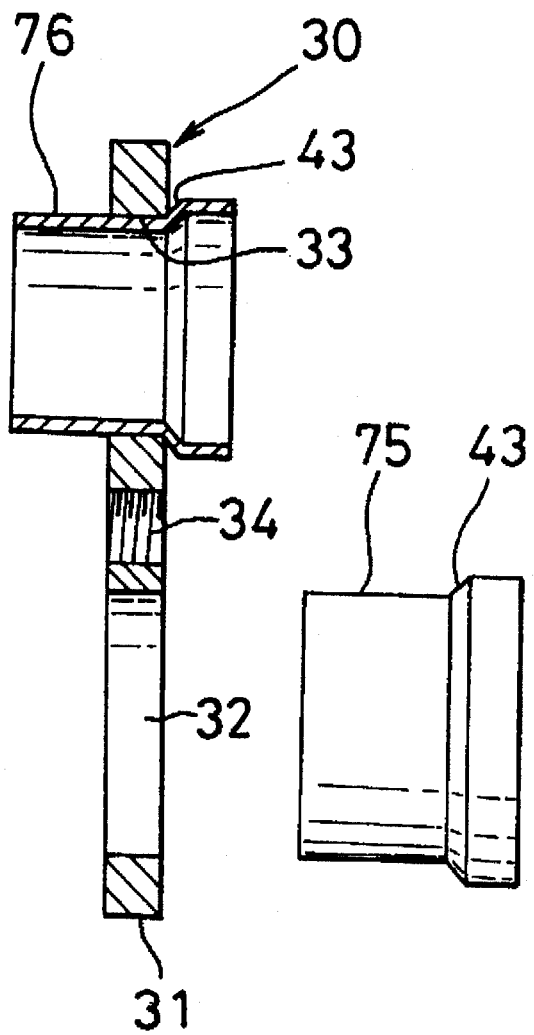
FIG. 8 illustrates tubular members manufactured by either expanding or contracting one of the openings of the pipe and which are different from the tubular members used in the expansion valve mounting members in the two previous embodiments.

Next, another embodiment is explained in reference to FIGS. 6–8. However, note that the structures of members other than the tubular members, i.e., the structures of the plate member 31 and the heat exchanger core (the tube elements 3, the end plate 4, the fins 2 and the plate for intake/outlet passage formation 20) are identical to those in the previous embodiment, and their explanation is omitted.

Tubular members 65 and 66 shown in FIG. 6 are each formed by machining a rod-like member constituted mainly of aluminum and whose length is greater than the thickness of the plate member 31. Each is provided with a communicating hole 38 that is bored through the center in the direction of the axis, and has its external circumferential side surface machined. Pipes 39a and 40a that are inserted in the expansion valve 50, pipes 39b and 40b, which are inserted in the holes 32 and 33 of the plate member 31 and pipes 39c and 40c which are inserted in the connecting holes 21 and 23 of the outlet passage 22 and intake passage 24 respectively, are formed sequentially in that order. In addition, at the border that separates the pipes 39b and 40b from, the pipes 39a and 40a, respectively, collars 41, whose diameter is greater than the internal diameter of the holes 32 and 33, are formed.

Now, by inserting the tubular members 65 and 66 into the holes 32 and 33 from the side where the expansion valve is to be mounted until the collars 41 are stopped by the plate member 31, the expansion valve mounting member 30 is temporarily assembled in such a manner that the pipes 39c and 40c of the tubular members 65 and 66 protrude out. Then, the pipes 39c and 40c of the tubular members 65 and 66 are inserted into the holes 21 and 23 until the stages between the pipes 39c and 40c and the pipes 39b and 40b come into contact with the circumferential edges of the holes 21 and 23. At this point, the assembly, while mounted on the heat exchanger core, is brazed in a furnace as an integral part of the heat exchanger.

Note that the positioning for inserting the tubular members 65 and 66 into the holes 21 and 23 of the outlet passage 22 and the intake passage 24, respectively may also be achieved, as shown in FIG. 7, with collars 42, which are formed at specific positions on the external circumferential surfaces of the pipes 39c and 40c which connect to the outlet passage 22 and the intake passage 24 respectively. In this manner, gaps will be formed between the plate member 31 and outlet passage 22 and between the plate member 31 and the intake passage 24, which are equal to the distance between the plate member 31 and the collars 42.

Other types of tubular members, 75 and 76, shown in FIG. 8, are each constituted by a pipe-like member, the diameter of which is equal to that of the holes 32 and 33 and the length of which is greater than the thickness of the plate member 31, and each provided with a staged portion or transition portion 43 at one end, formed by enlarging the pipe through, for instance, press machining.

By inserting the tubular members 75 and 76 from the side opposite where the expansion valve is to be mounted until the staged portions 43 come in contact with the holes 32 and 33 of the plate member 31, the expansion valve mounting member 30 with the tubular members 75 and 76 protruding out on the side that is opposite where the expansion valve is to be mounted, is temporarily assembled. Then, the tubular members 75 and 76 are inserted through the holes 21 and 23 of the outlet passage 22 and the intake passage 24 respectively. At this point, the assembly, while mounted on the heat exchanger core, is brazed in a furnace as an integral part of the heat exchanger.

Note that explanation has been given for a case in which the staged portions 43 are formed by expanding pipes whose diameter is equal to that of the holes 32 and 33. However, pipes with a diameter greater than that of the holes 32 and 33 may be used, in which case they may be contracted to the diameter of the holes 32 and 33 by press machining.

Although in the embodiments described so far, the present invention is explained with the assumption that the intake/outlet portions of the heat exchanger are provided at the plate for intake/outlet passage formation 20, which is formed to the outside from the end plate 4, it is obvious that the present invention can be applied to a structure in which the intake/outlet portions of the heat exchanger are provided parallel to each other at the front relative to the airflow.

As has been explained, with the expansion valve mounting member according to the present invention, the tubular members and the plate member are manufactured separately, and since the expansion valve mounting member is assembled by inserting the tubular members into the holes in the plate member, the production cost can be kept low compared to a structure that requires full cutting of the expansion valve mounting member. At the same time, mass production is facilitated.

What is claimed is:

1. A heat exchanger comprising:
   a heat exchanger assembly comprising:
      a plurality of fins,
      a plurality of tube elements alternately laminated with said fins, each of said tube elements comprising a pair of tanks at one end thereof and a U-shaped passage communicating said pair of tanks with each other, said plurality of tube elements and said fins forming a first sub-assembly having opposite sides in a direction of lamination,
   end plates located on said opposite sides of said first sub-assembly, and
   a plate having an intake passage and an outlet passage therein secured to one of said end plates,
      wherein a pair of tank groups are formed by said tanks of said tube elements by connecting said tanks adjacent to one another in the direction of lamination, one of said pair of tank groups comprises two first tank sub-groups formed by separating the one of said pair of tank groups at a central position of the one of said pair of tank groups with respect to the direction of lamination, and the other of said pair of tank groups comprises two second tank sub-groups that directly fluidly communicate with each other, wherein a communicating pipe is connected between one of said intake passage and said outlet passage and the one of said two first tank sub-groups located furthest from said plate, and the other of said intake passage and said outlet passage is communicated with the other of said two first tank sub-groups, located closest to said plate, and wherein said plate has an intake hole and an outlet hole therein communicating with said intake passage and said outlet passage, respectively; and an expansion valve mounting member comprising:

a pair of tubular members, each one of said pair of tubular members having one end for connection with one of said intake hole and said outlet hole and another end for connection with an expansion valve, and each one of said pair of tubular members having an external circumferential surface with a collar formed at a predetermined position thereon, and a plate member having a pair of holes receiving said pair of tubular members inserted therein, said plate member having a specific width, wherein said expansion valve mounting member has been temporarily assembled by inserting said tubular members into said holes of said plate member such that said collars contact circumferential edges of said holes of said plate member so as to position said tubular members relative to said plate member;

wherein said expansion valve mounting member is mounted on said intake and outlet holes of said intake and outlet passages of said heat exchanger assembly; and wherein said heat exchanger assembly and said expansion valve mounting member have been simultaneously brazed together in a furnace.

2. The heat exchanger of claim 1, wherein said tubular members are press formed and said collars comprise external walls of said tubular member that are bent toward the outside of said tubular members.

3. The heat exchanger of claim 1, wherein each of said tubular members are machined so as to have a first diameter portion adapted to be connected to the expansion valve, a second diameter portion inserted into one of said holes of said plate member and a third diameter portion that is connected to one of said intake and outlet holes of said plate, said collar being located between said first diameter portion and said second diameter portion.

4. The heat exchanger of claim 1, wherein said collars of said tubular members contact said circumferential edges of said holes on a first side of said plate member facing away from said plate having said intake and outlet passages.

5. The heat exchanger of claim 4, wherein said one ends of said pair of tubular members protrude out of a second side of said plate member opposite to said first side and facing said plate having said intake and outlet passages, said one ends extending into said intake and outlet holes of said intake and outlet passages.

6. The heat exchanger assembly of claim 5, wherein said plate comprises circumferential portions defining said intake and outlet holes of said intake and outlet passages, said circumferential portions engaging said second side of said plate members.

7. A heat exchanger comprising:

a heat exchanger assembly comprising:

a plurality of fins, a plurality of tube elements alternately laminated with said fins, each of said tube elements comprising a pair of tanks at one end thereof and a U-shaped passage communicating said pair of tanks with each other, said plurality of tube elements and said fins forming a first sub-assembly having opposite sides in a direction of lamination, end plates located on said opposite sides of said first sub-assembly, and a plate having an intake passage and an outlet passage therein secured to one of said end plates, wherein a pair of tank groups are formed by said tanks of said tube elements by connecting said tanks adjacent to one another in the direction of lamination, one of said pair of tank groups comprises two first tank sub-groups formed by separating the one of said pair of tank groups at a central position of the one of said pair of tank groups with respect to the direction of lamination, and the other of said pair of tank groups comprises two second tank sub-groups that directly fluidly communicate with each other, wherein a communicating pipe is connected between one of said intake passage and said outlet passage and the one of said two first tank sub-groups located furthest from said plate, and the other of said intake passage and said outlet passage is communicated with the other of said two first tank sub-groups, located closest to said plate, and wherein said plate has an intake hole and an outlet hole therein communicating with said intake passage and said outlet passage, respectively; and an expansion valve mounting member comprising:

a pair of tubular members, each one of said pair of tubular members having one end for connection with one of said intake hole and said outlet hole and another end for connection with an expansion valve, and each one of said pair of tubular member having an external circumferential surface with a transition portion formed at a predetermined position thereon, said transition portion increasing the diameter of each one of said pair of tubular members from a first diameter to second, larger, diameter, and a plate member having a pair of holes receiving said pair of tubular members inserted therein, said plate member having a specific width, wherein said expansion valve mounting member has been temporarily assembled by inserting said tubular members into said holes of said plate member such that said transition portions contact circumferential edges of said holes of said plate member so as to position said tubular members relative to said plate member;

wherein said expansion valve mounting member is mounted on said intake and outlet holes of said intake and outlet passages of said heat exchanger assembly; and wherein said heat exchanger assembly and said expansion valve mounting member have been simultaneously brazed together in a furnace.

* * * * *